United States Patent
Tanaka et al.

[15] 3,691,379
[45] Sept. 12, 1972

[54] SCINTILLATION CAMERA DEVICE

[72] Inventors: Eiichi Tanaka, Tokyo; Toshiyuki Hiramoto; Norimasa Nohara, both of Chiba, all of Japan

[73] Assignee: Director National Institute of Radiological Sciences, Science and Technology Agency, Chiba-shi, Japan

[22] Filed: Oct. 1, 1970

[21] Appl. No.: 77,305

[30] Foreign Application Priority Data

Oct. 1, 1969   Japan ...................... 44/77803

[52] U.S. Cl. ............................................ 250/71.5 R
[51] Int. Cl. ............................................... G01t 1/20
[58] Field of Search ......... 250/71.5 R, 83.3 R, 83.6 R

[56] References Cited

UNITED STATES PATENTS 3,011,057   11/1961   Anger ................... 250/71.5 R
3,327,116   6/1967   Loveday ............... 250/71.5 R Primary Examiner—James W. Lawrence
Assistant Examiner—Davis L. Willis
Attorney—Flynn & Frishauf

[57] ABSTRACT

A scintillation camera device wherein output pulse signals from photomultipliers optically coupled with a scintillator giving forth light upon absorption of radiation from a radioactive isotope taken into a foreground subject are supplied to a delay element such as a delay line for separating said output signals in time sequence so as to render them proportionate to the co-ordinate position of said photomultipliers; output signals from the delay element are shaped into bipolar symmetrical waves in a double delay line type wave forming circuit in such a manner that the zero-crossing time of a composite of wave forms is obtained in accordance with the co-ordinate position of the scintillation point; and the zero-crossing time of said composite wave form is converted to voltage, which is indicated on a cathode ray tube as the position of the scintillation point.

5 Claims, 8 Drawing Figures

SCINTILLATION CAMERA DEVICE

The present invention relates to improvements in a scintillation camera device used in nuclear medicine to determine the distribution of a radioactive isotope taken into a human body or other objects.

When radiation emitted from a radioactive isotope taken into a foreground subject are conducted to a scintillator through a collimator, said scintillator gives forth fluorescent rays. Since the position of the scintillation point corresponds to the position of a radioactive isotope present in the foreground subject, the plane distribution of said radioactive isotope is observed in the form of an image of light given forth by the scintillator. Since, however, this light is extremely faint, there are used, for example, a plurality of photoamplifiers coupled with a scintillator which are arranged in the form of a regular hexagon in order to intensify said light. Outputs from the photoamplifiers are proportionate to the intensity of light initially introduced into the scintillator. If, therefore, outputs from those of the photomultipliers which are disposed close to the scintillation point are indicated on a cathode ray tube, then it will be possible to determine the position of a scintillation point. The prior art scintillation camera, however, which is only provided with a limited number of photomultipliers has caused outputs from the photomultipliers to be multiplied by weighting factors specified for said photomultipliers using a resistance matrix in order to find the exact position of the scintillation point. Now with only one dimension taken into consideration, let one of the longest diagonal lines of a regular hexagon representing the arrangement of photomultipliers be designated as a coordinate axis X, those of the photomultipliers disposed on said axis X as $a, b, c, d$ and $e$ and outputs therefrom as $a_1, b_1, c_1, d_1$ and $e_1$. These outputs $a_1, b_1, c_1, d_1$ and $e_1$ are multiplied by two groups of weighting factors, the weighting factors of one group denoted, for example, as $K_1, K_2, K_3, K_4$ and $K_5$ linearly decrease in the order mentioned. The weighting factors of the other group represented, for example, as $H_1, H_2, H_3, H_4$ and $H_5$ linearly increase in turn. Let it be assumed that a total of products arrived at by multiplying outputs $a_1, b_1, c_1, d_1$ and $e_1$ from the photomultipliers by the weighting factors $K_1, K_2, K_3, K_4$ and $K_5$ respectively is designated as $X^+$. Then there results the equation:

$$X^+ = K_1 a_1 + K_2 b_1 + K_3 c_1 + K_4 d_1 + K_5 e_1$$

On the other hand, let a total of products obtained by multiplying said outputs by $H_1, H_2, H_3, H_4$ and $H_5$ respectively be denoted as $X^-$. Then there results the equation:

$$X^- = H_1 a_1 + H_2 b_1 + H_3 c_1 + H_4 d_1 + H_5 e_1$$

The value of $X^+ - X^- = X_0$ is calculated from the above equations to find the position of the scintillation point on the axis X. Since outputs from the photomultipliers are multiplied by the aforementioned weighting factors using a resistance matrix, the conventional device has the drawbacks that outputs from those of the photomultipliers which are disposed remote from the scintillation point are always multiplied by a fixed weighting factor, even when there are introduced only small amounts of light into the scintillator and consequently statistical fluctuations in the number of photoelectrons brought to the first dynode of the photomultiplier and noises caused by the scattering of light are unduly emphasized, resulting in the failure to determine the exact position of a scintillation point and the decreased resolving power of the camera device. Further, the limited number of photomultipliers most likely causes the optical image of a radioactive isotope taken into a foreground subject to be distorted on the edge. However, there has not heretofore been developed any suitable means conducive to the resolution of the aforesaid shortcomings encountered with the conventional scintillation camera device.

SUMMARY OF THE INVENTION

The object of the present invention is to provide a scintillation camera device wherein output signals from the photomultipliers are separated in time sequence in accordance with the co-ordinate position of said photomultipliers by using a delay element such as a delay line; outputs from said delay element such as a delay line are shaped into bipolar symmetrical wave forms in a wave forming circuit comprising a double delay line, thereby detecting the exact position of a scintillation point utilizing the fact that the zero-crossing time of a composite of said symmetrical wave forms corresponds to the position of the scintillation point.

The present invention enables outputs from those of the photomultipliers which are disposed remote from the scintillation point to be excluded from the determination of its position, thereby offering a novel scintillation camera device capable of obtaining signals denoting the exact position of the scintillation point and accurately resolving the optical image of a radioactive isotope taken into a foreground subject.

This invention can be more fully understood from the following detailed description when taken in connection with the accompanying drawings, in which:

FIG. 1 presents a schematic arrangement of a scintillation camera device according to an embodiment of the present invention;

Figure 1:
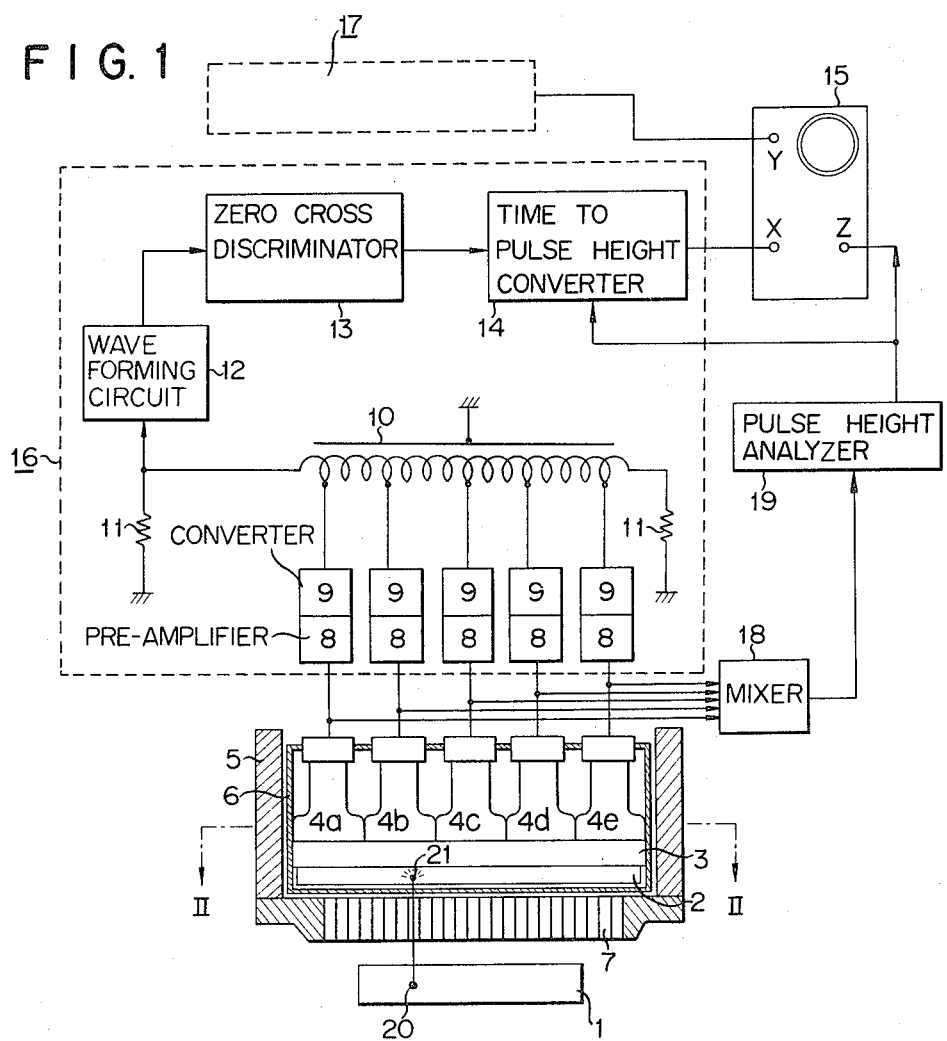
Figure 4A:
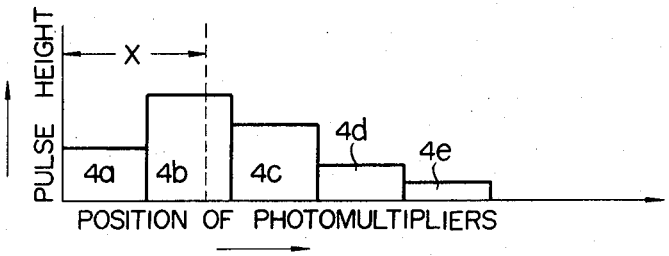
FIG. 4A shows output pulses from the photomultipliers with respect to the scintillation point of FIG. 1.
Figure 4B:
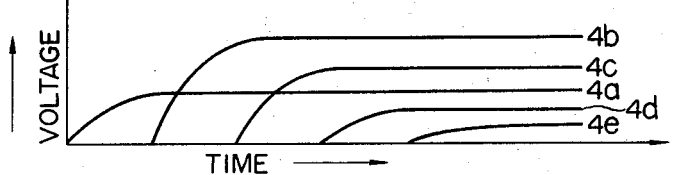
Figure 4C:
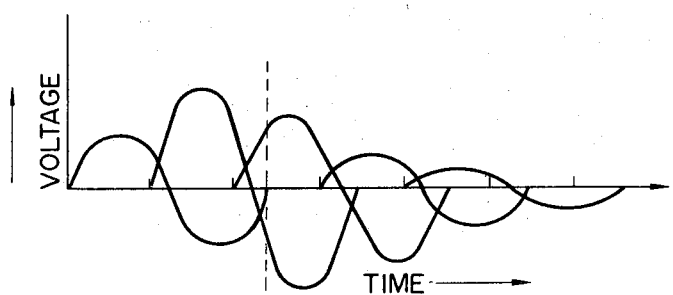
Figure 4D:
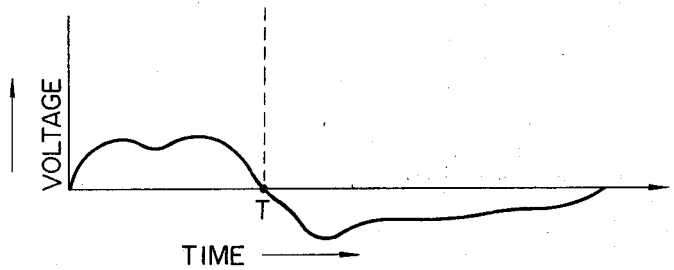

FIG. 4B indicates the wave forms of outputs from the delay line of FIG. 1;

FIG. 4C illustrates the shaped wave forms of FIG. 4B;

FIG. 4D presents a composite pattern of the wave forms of FIG. 4C; and

Figure 5:
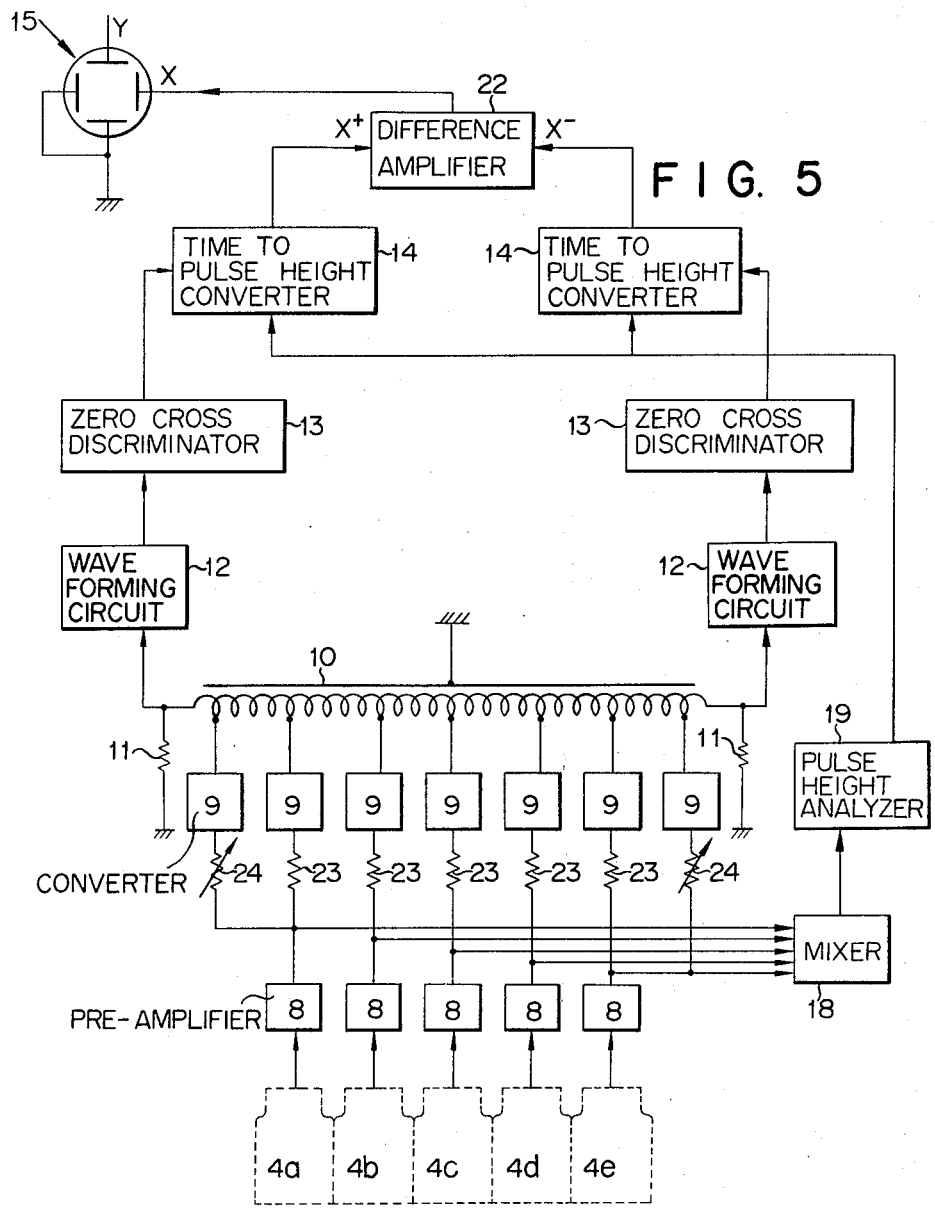

FIG. 5 is a block circuit diagram of a scintillation camera device according to another embodiment of the invention.

Figure 2:
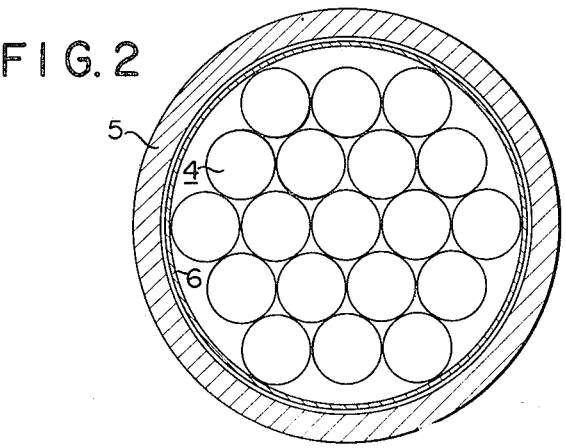
FIG. 2 is a sectional view on line II — II of FIG. 1.
Figure 3:
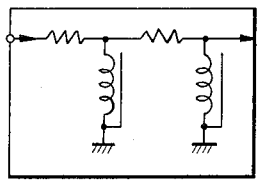
FIG. 3 is a concrete circuit diagram of a wave forming circuit used in FIG. 1.

As shown in FIG. 1, there are positioned above a foreground subject 1 a scintillator 2 for giving forth fluorescent rays upon absorption of radiation emitted from a radioactive isotope taken into the foreground subject 1 and a plurality of photomultipliers 4 for detecting fluorescent rays from the scintillator 2 through a light guide 3 and converting said rays to electrical signals. Said photomultipliers 4 comprise nineteen units assembled, for example, in the form of a substantially regular hexagon illustrated in FIG. 2. Some of said photomultipliers 4 are linearly arranged on one of the longest diagonal lines of the hexagon. The scintillator 2, light guide 3 and plural photomultipliers 4 are enveloped in a photomagazine 5 and placed in a box member 6. The lower open part of the box member 6 facing the foreground subject 1 is fitted with a collimator 7 for collimating radiation emitted from the radioactive isotope taken into the foreground subject 1. Output signals from the plural photomultipliers are conducted to the terminals of a delay line 10 through pre-amplifiers 8 and converters 9. The delay line 10 may be replaced by a delay element. Both terminals of the delay line are grounded through the respective resistors 11. One of said terminals is connected to the input terminal of the wave forming circuit 12, the output terminal of which is connected to the input terminal of a cathode ray tube 15 through a zero crossing discriminator 13 and a time-to-pulse height converter 14 in turn. The wave forming circuit consists of a double delay line connected as in FIG. 3.

A circuit 16 extending from the preamplifiers 8 supplied with outputs from the photomultipliers 4 to the terminal X of the cathode ray tube is used to determine the position of the co-ordinate axis X included in those axes which indicate the scintillation point. With respect to the co-ordinate axis Y, there is connected to the terminal Y of the cathode ray tube 15 another circuit 17 of exactly the same arrangement as the circuit 16. The output terminals of the plural photomultipliers 4 are connected to a mixer 18, where outputs therefrom are added up. Signals representing a sum of said outputs are conducted through a pulse height analyzer 19 to the time-to-height converter 14, and also to the terminal Z of the cathode ray tube 15 for unblanking.

There will now be described the operation of scintillation camera device according to an embodiment of the present invention with particular reference for briefness only to one dimension (for example, the co-ordinate axis X).

Radiation emitted at point 20 of the foreground subject 1 is conducted through the collimator 7 and absorbed into the scintillator 2, causing it to give forth light. Said light is introduced through the light guide 3 into the photomultipliers 4 to be converted to current. Outputs from the photomultipliers 4 assume the wave forms of FIG. 4A which are proportionate to the quantity of light brought in. Said outputs are amplified by the preamplifiers 8 and converted to current by the converter 9 and then supplied to the delay line 10. Outputs from the delay line 10 are separated, as illustrated in FIG. 4B, in time sequence in accordance with the position of the photomultipliers on the co-ordinate axis X. Outputs thus separated are shaped by the wave forming circuit 12 into bipolar symmetrical wave forms indicated in FIG. 4C. A composite of said symmetrical wave forms presents such a form as shown in FIG. 4D. The zero-crossing time of said composite wave form corresponds to the position of the scintillation point on the co-ordinate axis X shown in FIG. 4A. Signals representing the zero-crossing time are detected by the zero cross discriminator and converted to voltage by the time-to-pulse height converter 14.

The time-to-pulse height converter 14 generates a voltage proportionate to a balance between the time required for outputs from pulse height analyzer 19 to be conducted to said converter and the zero-crossing time. The output voltage from the time-to-pulse height converter 14 is fed to the cathode ray tube 15 as a signal denoting the position of a scintillation point. The output signal from the pulse height analyzer 19 is also conducted to the terminal Z of the cathode ray tube 15 for unblanking.

According to the present invention, outputs from the photomultipliers are shaped into bipolar symmetrical wave forms by a wave forming circuit comprising a double delay line and the position of a scintillation point can be determined from the zero-crossing time of a composite of said symmetrical wave forms, thus eliminating the necessity of multiplying outputs from the photomultipliers 4 by weighting factors.

FIG. 5 is a block circuit diagram of a scintillation camera device according to another embodiment of the present invention only associated with one dimension (for example, the co-ordinate axis X). In FIG. 5, pre-amplifiers 8 are connected to the photomultipliers 4. The output terminals of the pre-amplifiers 8 are connected to the delay line 10 through a resistor 23 and the converter 9 for converting voltage to current. There is also provided a variable resistor 24 so as to eliminate peripheral distortions on the edge of an image of the radioactive isotope taken in a foreground subject. Both ends of the delay line 10 are grounded through the resistor 11. To both output terminals of the delay line 10 are connected a first and a second series circuit, each of which is comprised of the wave forming circuit 12, zero crossing discriminator 13 and time-to-pulse height converter 14. Outputs conducted from the photomultipliers 4 through the pre-amplifiers 8 and converters 9 to the delay line 10 are separated, as shown in FIG. 4B, in time sequence in accordance with the position of the photomultipliers 4 on the co-ordinate axis X. In the wave forming circuit 12 included in the first series circuit connected to one end of the delay line 10, outputs from said delay line 10 are shaped into bipolar symmetrical wave forms illustrated in FIG. 4C. The zero-crossing time T of a composite of said symmetrical wave forms corresponds to the position of a scintillation point on the co-ordinate axis X. Signals representing the zero-crossing time T are detected by the zero crossing discriminator 13, and converted to voltage by the time-to-pulse height converter 14, obtaining signals $X^+$ denoting the position of a scintillation point into the positive direction of the co-ordinate axis X. Similarly from the second series circuit connected to the other end of the delay line 10 are obtained signals $X^-$ representing the position of a scintillation point in the negative direction of the co-ordinate axis X. There is also provided a differential amplifier 22 to determine a balance between the values of the signals $X^+$ and $X^-$, thereby obtaining signals X indicating the position of a scintillation point on the co-ordinate axis X.

On the other hand, output signals from the photomultipliers 4 added up by the mixer 18 are proportionate to gamma ray energy and are fed to the pulse height converter 14. The time-to-pulse height connector generates a voltage proportionate to a balance between the required outputs from the pulse height analyzer 19 and zero-crossing time. Signals X from the differential amplifier 22 which denote the position of a scintillation point on the co-ordinate axis X are fed to the cathode ray tube.

As mentioned above, the present invention comprises a delay line associated with the co-ordinate axes X and Y and a wave forming circuit comprising a double delay line to exclude outputs from those of the photomultipliers 4 which are disposed distant from a scintillation point in determining its position, thereby providing a scintillation camera device having a good resolving power.

What we claim is:

1. A scintillation camera device comprising a scintillator for giving forth light upon absorption of radiation from a radio active isotope taken into a foreground subject; a plurality of photomultipliers supplied with light from the scintillator; delay elements corresponding to the co-ordinate axes X and Y respectively for separating outputs from the photomultipliers in time sequence in accordance with the co-ordinate position of said photomultipliers; wave forming circuits associated with the co-ordinate axes X and Y for shaping outputs from said delay elements into bipolar symmetrical wave forms; zero-crossing discriminators associated with the co-ordinate axes X and Y for detecting the zero-crossing time of a composite to bipolar symmetrical wave forms obtained from the wave forming circuit; time-to-pulse height converters associated with the co-ordinate axes X and Y for converting to voltage the signals representing the zero-crossing time of said composite wave form from the zero cross discriminator and a cathode ray tube to which there is connected the output terminal of the time-to-pulse height converter.

2. A device according to claim 1 wherein said wave forming circuit comprises a double delay line.

3. A device according to claim 1 wherein there is connected between the output terminals of the photomultipliers and delay line a series circuit including a pre-amplifier and a converter for converting voltage to current.

4. A scintillation camera device comprising a scintillator for giving forth light upon absorption of radiation emitted from a radioactive isotope taken into a foreground subject; a plurality of photomultipliers supplied with light from the scintillator; delay elements for separating outputs from the photomultipliers in time sequence in accordance with the co-ordinate position of said photomultipliers; series circuits each comprising a pre-amplifier for conducting outputs from the photomultipliers to said delay elements and a converter for converting voltage to current; first and a second conversion circuits each comprised of wave forming circuits connected to both ends of the respective delay elements associated with the co-ordinate axes for shaping outputs from the delay elements into bipolar symmetrical wave forms in order to convert said outputs to signals denoting the position of a scintillation point, zero crossing discriminators for detecting the zero-crossing time of a composite of said bipolar symmetrical wave forms and time-to-pulse height converters for converting to voltage signals from the zero crossing discriminators representing the zero-crossing time; a differential amplifier for determining a balance between the values of outputs from said time-to-pulse height converters; a cathode ray tube connected to the output terminals of the differential amplifier on each co-ordinate axis; a mixer for adding up outputs from the pre-amplifiers; and a pulse height analyzer for selecting those of the outputs from the mixer which are proportionate to gamma ray energy and supplying the selected outputs to the time-to-pulse height converter.

5. A device according to claim 4 comprising a connecting component which includes a converter and a variable resistor for eliminating peripheral distortions associated with the outermost of the photomultipliers.

* * * * *